US012747172B2

(12) United States Patent
Dukes et al.

(10) Patent No.: US 12,747,172 B2
(45) Date of Patent: Sep. 29, 2026

(54) ION EXCHANGE MEMBRANE COMPOSITION AND METHODS FOR THE CONCENTRATION OF PERFLUOROALKYL SUBSTANCES

(71) Applicant: Evoqua Water Technologies LLC, Pittsburgh, PA (US)

(72) Inventors: Simon P. Dukes, Chelmsford, MA (US); George Gu, Andover, MA (US); Savvas Hadjikyriacou, Tyngsboro, MA (US); Yang Chen, Lowell, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 623 days.

(21) Appl. No.: 17/914,156

(22) PCT Filed: Mar. 23, 2021

(86) PCT No.: PCT/US2021/023759

§ 371 (c)(1),
(2) Date: Sep. 23, 2022

(87) PCT Pub. No.: WO2021/195134

PCT Pub. Date: Sep. 30, 2021

(65) Prior Publication Data

US 2023/0130585 A1 Apr. 27, 2023

Related U.S. Application Data

(60) Provisional application No. 62/993,250, filed on Mar. 23, 2020.

(51) Int. Cl.
*C02F 1/469* (2023.01)
*B01D 69/02* (2006.01)
*C02F 1/42* (2023.01)
*C02F 101/36* (2006.01)

(52) U.S. Cl.
CPC ............ *C02F 1/4693* (2013.01); *B01D 69/02* (2013.01); *C02F 1/42* (2013.01); *B01D 2325/04* (2013.01); *B01D 2325/26* (2013.01); *C02F 2101/36* (2013.01); *C02F 2201/46115* (2013.01); *C02F 2201/4613* (2013.01); *C02F 2201/46135* (2013.01); *C02F 2201/46185* (2013.01); *C02F 2209/005* (2013.01); *C02F 2303/16* (2013.01)

(58) Field of Classification Search
CPC ........ C02F 2303/16; C02F 2201/46135; C02F 2201/46115; C02F 1/4693
See application file for complete search history.

(56) References Cited

U.S. PATENT DOCUMENTS

| | | | | |
|---|---|---|---|---|
| 8,906,529 | B2 | 12/2014 | Horne et al. | |
| 8,969,424 | B2 | 3/2015 | Lin | |
| 9,023,902 | B2 | 5/2015 | Lin et al. | |
| 10,622,657 | B1 | 4/2020 | Kim et al. | |
| 2011/0223450 | A1 | 9/2011 | Horne et al. | |
| 2013/0186761 | A1 * | 7/2013 | Van Der Wal ....... | C08G 83/005 204/554 |
| 2013/0313118 | A1 | 11/2013 | Lin | |
| 2015/0315042 | A1 * | 11/2015 | Lin ........................ | C02F 1/4695 427/508 |
| 2016/0168346 | A1 | 6/2016 | Kamada et al. | |
| 2016/0308235 | A1 | 10/2016 | Reece | |
| 2017/0036171 | A1 | 2/2017 | Lienhard et al. | |
| 2019/0148963 | A1 | 5/2019 | Nakao | |
| 2019/0185352 | A1 * | 6/2019 | Chiang ................. | C02F 1/4672 |

FOREIGN PATENT DOCUMENTS

| | | | | |
|---|---|---|---|---|
| CN | 104703697 | A | 6/2015 | |
| CN | 105219060 | A | 1/2016 | |
| WO | WO-2005079961 | A1 * | 9/2005 | ......... B01D 61/4251 |
| WO | 2010007399 | A1 | 1/2010 | |
| WO | 2010133854 | A1 | 11/2010 | |
| WO | 2011025867 | A1 | 3/2011 | |
| WO | 2014195758 | A1 | 12/2014 | |
| WO | 2017147568 | A1 | 8/2017 | |

(Continued)

OTHER PUBLICATIONS

Niarchos (KTH Royal Institute of Technology, School of Architecture and Built Environment, 2018) "Electrodialytic Remediation of PFAS-Contaminated Soil" (Year: 2018).*
Kentish et al. (Separation & Purification Reviews, 44:269-282, 2015) "Electrodialysis in Aqueous-Organic Mixtures" (Year: 2015).*
Rype, J-U,"Modeling of Electrically Driven Membrane Process," Technical University of Denmark, Department of Chemical Engineering, a dissertation, pp. 104, 138, Oct. 2002, http://orbit.dtu.dk/fedora/objects/orbit>.
Dlugolecki, P. et al, "Journal of Membrane Science, On the resistances of membrane, diffusion boundary layer and double layer iin ion exchane membrane transport," vol. 349, No. 1-2, pp. 369-370, Mar. 1, 2010; abstract; p. 372, col. 2, first-second paragraph.
Maxwell Technologies, High Voltage Power Grid, Sep. 29, 2017, http://www.maxwell.com/solutions/power-grid-high-voltage; p. 1.
Electropedia< "Electric Vehicle Charging Infrastructure," Apr. 2, 2012, https://www.mpoweruk.com/infrastructure.htm.

(Continued)

*Primary Examiner* — Ryan B Huang

(57) ABSTRACT

Methods of treating a waste stream containing perfluoroalkyl substances (PFAS) are disclosed. The methods include directing the waste stream to a dilution compartment of an electrochemical separation device, directing a treatment stream to a concentration compartment of the electrochemical separation device, and applying a voltage across the electrodes to produce a dilute stream substantially free of the PFAS and a concentrate stream. At least one of the waste stream and the treatment stream comprises a water miscible organic solvent. Methods of concentrating PFAS from a wastewater are also disclosed. PFAS concentration systems are also disclosed. The systems include a column comprising an ion exchange resin and an electrochemical separation device having a dilution compartment fluidly connected to an outlet of the column. Methods of facilitating treatment of a waste stream containing PFAS are also disclosed.

16 Claims, 4 Drawing Sheets

(56) References Cited

FOREIGN PATENT DOCUMENTS

WO 2019118662 A1 6/2019

OTHER PUBLICATIONS

Zhao, Y et al., "Advanced Charged Sponge-Like Membrane with Ultrahigh Stability and Selectivity for Vanadium Flow Batteries," Advanced Functional Materials, vol. 26, 2015.
Fumatech WT GMBH, "Redox-Flow-Batteries," Feb. 23, 2017, https://www.fumatech.com/NR/rdonlyres/6E4FA7B9-0AAA-42B9-98E4-BF756C23F981/0/FUMATECH_BWT_GmbHRedoxFlowBatteries.pdf.
International Search Report, corresponding PCT/US21/23759, dated Sep. 14, 2021.
Niarchos "Electrodialytic Remediation of PFAS-Contaminated Soil" Degree Project in Environmental Engineering (2018) KTH Royal Institute of Technology School of Architecture and the Built Environment. Entirety of document especially Title; Abstract; Fig. 5; p. 9, para. 3; p. 10 para. 4; p. 20 para. 2; p. 22 para. 2.
Kentish et al., "Electrodialysis in Aqueous-Organic Mixtures" 2015, Separation and Purification Reviews, vol. 44, Issue 4, pp. 269-282.
Kim et al., "Research Trends in Ion Exchange Membrane Proesses and Practical Applications," Applied Chemical Engineering, 2015, vol. 26, No. 1, pp. 1-16.
Electrodialysis Wilkopedia Aug. 5, 2019, retrieved from https://en.wilkipedia.org/w/index.php?title+Electrodialysis&oldid=909472057.
Taieb, Hagit, "Notice of Deficiencies", Israeli Patent Application No. 296782, mailed Mar. 19, 2025.
Haque, Shah, "Examination Report No. 1 for", Australian Patent Application No. 2021244466, mailed Mar. 6, 2026, 4 pages.
Taieb, Hagit, "Notice of Deficiencies", Israeli Patent Application No. 322163, mailed Jan. 12, 2026, 6 pages.
Kuang, Connie, "Notified of a Requisition by The Examiner", Canadian Patent Application No. 3172500, mailed Jan. 9, 2026, 7 pages.

* cited by examiner

ION EXCHANGE MEMBRANE COMPOSITION AND METHODS FOR THE CONCENTRATION OF PERFLUOROALKYL SUBSTANCES

CROSS-REFERENCE TO RELATED APPLICATIONS

This application claims priority under 35 U.S.C. § 119(e) to U.S. Provisional Application Ser. No. 62/993,250 titled "Ion Exchange Membrane Composition and Methods for the Concentration of Perfluoroalkyl Substances" filed on Mar. 23, 2020, which is herein incorporated by reference in its entirety.

FIELD OF TECHNOLOGY

Aspects and embodiments disclosed herein relate to methods of concentrating perfluoroalkyl and polyfluoroalkyl substances. More particularly, aspects and embodiments disclosed herein relate to methods of concentrating perfluoroalkyl and polyfluoroalkyl substances in an alcohol solution.

SUMMARY

In accordance with one aspect, there is provided a method of treating a waste stream containing perfluoroalkyl substances (PFAS) with an electrochemical separation device. The electrochemical separation device may comprise a dilution compartment, a concentration compartment, an ion exchange membrane positioned between the dilution compartment and the concentration compartment, and first and second electrodes. The method may comprise directing the waste stream containing the PFAS to the dilution compartment. The method may comprise directing a treatment stream to the concentration compartment. The method may comprise applying a voltage across the first and second electrodes to produce a dilute stream being substantially free of the PFAS and a concentrate stream. At least one of the waste stream and the treatment stream may comprise a water miscible organic solvent.

In some embodiments, the waste stream is an aqueous solution and the treatment stream comprises the water miscible organic solvent.

In some embodiments, the waste stream comprises the water miscible organic solvent and the treatment stream is an aqueous solution.

The water miscible organic solvent may be an alcohol solution.

In some embodiments, the alcohol solution may comprise at least one of methanol, ethanol, propanol, isopropanol, and butanol.

In some embodiments, the alcohol solution comprises methanol.

In some embodiments, the alcohol solution may be 45%-85% methanol by volume.

In some embodiments, the ion exchange membrane may be 50%-100% crosslinked.

The ion exchange membrane may have a thickness of 10-50 μm.

The ion exchange membrane may have a resistance of about 3-10 Ω-cm$^2$ when measured on direct current after equilibrium in a 0.5M NaCl solution at 25° C.

In some embodiments, applying the voltage across the first and second electrodes may produce the dilute stream having at least 95% less PFAS by volume than the waste stream.

In accordance with another aspect, there is provided a method of concentrating perfluoroalkyl substances (PFAS) from a wastewater containing a concentration of PFAS. The method may comprise passing the wastewater containing the PFAS over an ion exchange resin to uptake the PFAS onto the ion exchange resin. The method may comprise regenerating the ion exchange resin by passing a regeneration stream comprising an alcohol solution over the ion exchange resin to remove the PFAS and produce a waste stream comprising the alcohol solution containing the PFAS. The method may comprise directing the waste stream to a dilution compartment of an electrochemical separation device. The method may comprise directing an aqueous solution to a concentration compartment of the electrochemical separation device. The method may comprise applying a voltage across first and second electrodes of the electrochemical separation device through an ion exchange membrane positioned between the dilution compartment and the concentration compartment to produce a dilute stream comprising the alcohol solution being substantially free of the PFAS and a concentrate stream.

In some embodiments, the method may comprise directing the dilute stream to regenerate the ion exchange resin.

The regeneration stream may further comprise inorganic salts.

In accordance with another aspect, there is provided a perfluoroalkyl substances (PFAS) concentration system. The system may comprise a column comprising an ion exchange resin. The column may have a first inlet fluidly connectable to a source of a wastewater containing the PFAS, a second inlet fluidly connectable to a source of a regeneration solution comprising a water miscible organic solvent, a treated wastewater outlet, and a waste stream outlet. The system may comprise an electrochemical separation device comprising a dilution compartment having an inlet fluidly connected to the waste stream outlet and a dilute stream outlet fluidly connected to the second inlet of the column, a concentration compartment having an inlet fluidly connectable to a source of an aqueous solution and a concentrate stream outlet, an ion exchange membrane positioned between the dilution compartment and the concentration compartment, and first and a second electrodes positioned at distal ends of the electrochemical separation device.

In some embodiments, the ion exchange membrane comprises a cationic functional monomer having a crosslinking group.

In some embodiments, the ion exchange membrane may be 50%-100% crosslinked.

In some embodiments, the ion exchange membrane may be 70%-100% crosslinked.

The ion exchange membrane may have a thickness of 10-50 μm.

The ion exchange membrane may have a resistivity of about 3-10 Ω-cm$^2$ when measured on direct current after equilibrium in a 0.5M NaCl solution at 25° C.

In accordance with another aspect, there is provided a method of facilitating treatment of a waste stream containing perfluoroalkyl substances (PFAS). The method may comprise providing an electrochemical separation device. The electrochemical separation device may comprise a dilution compartment, a concentration compartment, a 50%-100% crosslinked ion exchange membrane positioned between the dilution compartment and the concentration compartment, and first and second electrodes positioned at distal ends of the electrochemical separation device. The method may comprise providing instructions to direct the waste stream containing the PFAS to the dilution compartment. The method may comprise providing instructions to direct a treatment stream to the concentration compartment. The method may comprise providing instructions to apply a voltage across the first and second electrodes to produce a dilute stream being substantially free of the PFAS and a concentrate stream. At least one of the waste stream and the treatment stream may comprise a water miscible organic solvent.

In some embodiments, the waste stream comprises the water miscible organic solvent.

The method may comprise providing instructions to direct the dilute stream to an ion exchange resin having the PFAS thereon.

In some embodiments, the treatment stream comprises the water miscible organic solvent.

In some embodiments, the waste stream is an aqueous solution containing the PFAS.

In some embodiments, the method may comprise providing instructions to direct the concentrate stream to a post-treatment subsystem.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
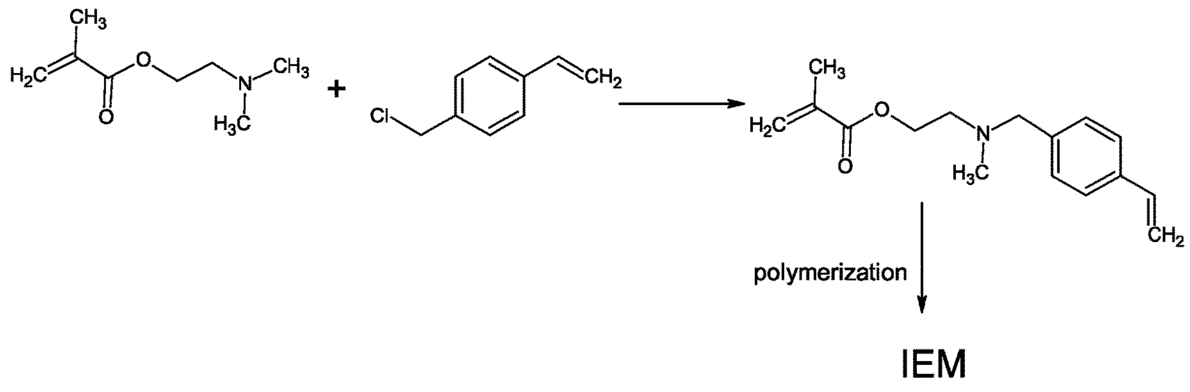
FIG. 1 shows the chemical structure of an exemplary quaternization reaction for formation of a crosslinking ionic monomer, according to one embodiment.

In accordance with an aspect, there is provided a method of operating an electrochemical separation device. Electrochemical separation devices disclosed herein may comprise a dilution compartment, a concentration compartment, an ion exchange membrane, and first and second electrodes. The ion exchange membrane may be positioned between the dilution compartment and the concentration compartment. Systems and methods disclosed herein may further include a first feed stream or first feed line fluidly connected to the dilution compartment, a second feed stream or second feed line fluidly connected to the concentration compartment, and a concentration compartment recycle stream or recycle line.

As used herein, "electrochemical separation device" refers to a device for purifying fluids using an electrical field. Electrochemical separation devices may be commonly used to treat water and other liquids containing dissolved ionic species. Electrochemical separation devices include, for example, electrodialysis devices. In some embodiments, the electrochemical device has a plate-and-frame or spiral wound design. Such designs may be used for various types of electrochemical deionization devices including, for example, electrodialysis devices.

Generally, electrochemical separation devices may employ an electric potential to influence ion transport and remove or reduce a concentration of one or more ionized or ionizable species from a fluid. Electrochemical devices may be operated to promote one or more electrochemical reactions specifically designed to achieve or enhance separation performance. For instance, electrochemical devices may drive ion transport in a specific direction through selectively permeable membranes by allowing ion transport in a specific direction, and preventing ion transport in another specific direction. In certain embodiments, electrochemical devices may comprise electrically active membranes, such as semi-permeable or selectively permeable ion exchange or bipolar membranes.

In certain electrochemical separation devices, such as those employed in systems and methods disclosed herein, a plurality of adjacent cells or compartments may be separated by selectively permeable membranes that allow the passage of either positively or negatively charged species, but typically not both. Dilution or depletion compartments are typically interspaced with concentrating or concentration compartments in such devices. As water flows through the dilution compartments, ionic and other charged species may be drawn into concentration compartments under the influence of an electric field, such as a DC field. Positively charged species may be drawn toward a cathode, generally located at one end of a stack of multiple dilution and concentration compartments. Negatively charged species may be drawn toward an anode of such devices, generally located at the opposite end of the stack of compartments.

The electrodes may be housed in electrolyte compartments that are generally partially isolated from fluid communication with the dilution and/or concentration compartments. Once in a concentration compartment, charged species may be trapped by a barrier of selectively permeable membranes, at least partially defining the concentration compartment. For example, anions may be prevented from migrating further toward the cathode, out of the concentration compartment, by a cation selective membrane. Similarly, cations may be prevented from migrating further toward the anode, out of the concentration compartment, by an anion selective membrane. Once captured in the concentration compartment, trapped charged species may be removed in a concentrate reject stream.

In electrochemical separation devices, the electric field is generally applied to the compartments from a source of voltage and electric current applied to the first and second electrodes. The voltage and current source, referred to herein collectively as the "power supply," may be itself powered by a variety of systems, such as an AC power source, or, for example, a power source derived from solar, wind, or wave power. In certain embodiments, the power source may generate electricity with an alcohol solution fuel source. For example, the power source may utilize an alcohol solution of the methods disclosed herein as a fuel source for generating electricity.

At the electrode-liquid interfaces, electrochemical half-cell reactions may occur that initiate and/or facilitate the transfer of ions through the membranes and compartments. The specific electrochemical reactions that occur at the electrode and membrane interfaces may be partially controlled by ionic concentration in the specialized compartments that house the electrode assemblies. For example, a feed to the anode electrolyte compartments that is high in sodium chloride may tend to generate chlorine gas and hydrogen ions, while such a feed to the cathode electrolyte compartment will tend to generate hydrogen gas and hydroxide ions.

Generally, the hydrogen ion generated at the anode compartment may associate with a free anion, such as chloride ion, to preserve charge neutrality and create hydrochloric acid solution. Analogously, the hydroxide ion generated at the cathode compartment may associate with a free cation, such as sodium, to preserve charge neutrality and create sodium hydroxide solution. The reaction products of the electrode compartments, such as generated chlorine gas and sodium hydroxide, may be utilized in the process as needed for disinfection purposes, for membrane cleaning and defouling purposes, and for pH adjustment purposes. Systems and methods disclosed herein may comprise an electrode feed line configured to deliver an electrode stream to the electrodes, an electrode line fluidly connecting the first and second electrodes to each other, and an electrode reject line configured to discharge electrode line waste. The electrodes may be fed with dilute water, for example, water from the first feed line, or with another specialized solution.

In electrochemical separation, maximizing the fraction of feed water that is converted to product water may be a major objective of the process. The fraction of converted feed is referred to herein as "recovery." Recovery is generally expressed as a percentage. Increasing recovery may reduce the capital and operating cost per unit product. For example, a high recovery may reduce the need or extent to which pretreatment of the feed water is necessary, thus reducing the cost of pretreating the feed water. Maximizing production rate and recovery may also be beneficial because many applications are driven by water shortage, water use restrictions, or limitations on discharge.

Electrochemical separation systems are generally used to concentrate ions in aqueous solutions. In an aqueous solution, a soluble salt may be dissolved by the formation of hydrolyzed ion pairs. When an electrical potential is applied to the positively charged anode and the negatively charged cathode, a current will form. At the electrode surfaces the electron transfer may take place creating new molecules on surfaces of the electrodes. In the solution phase, the cation and anion may be simultaneously and respectively transported to the cathode and anode. The ion migration in the solution phase may be visualized by ion displacement mechanism. Specifically, the cations and anions tend to move across the solution bulk in opposite directions toward each other.

The organic solvent electrolyte may be selected to have specific properties for a given electrochemistry application. For example, an aprotic organic solvent may be used in a lithium ion (Li-ion) battery to prevent the catastrophic reaction between the Li atom and the water or moisture. The organic solvent may provide a lower solubility to inorganic salts and a lower electrical conductivity. Water molecules may be employed to facilitate ion transport between two stationary ion exchange groups of an ion exchange membrane (IEM), due to the significant greater diameter of the water molecules compared to the salt ion.

An IEM may have a water content of 5%-30% under operating conditions in an aqueous solution. When a water miscible solvent solution is employed, the IEM water content is typically reduced in proportion to the water content in the solvent solution.

In applications for removing a hydrophobic ion from a solution, the IEM membrane is susceptible to fouling. Upon application of the electric field, the hydrophobic ion is generally retained on the membrane by both ion exchange and adsorption. Transport of the ion through the membrane is slow. The adsorbed ion tends to accumulate in the membrane bulk and cause fouling. Additionally, regeneration of the fouled membrane is difficult or impossible with a conventional aqueous salt solution.

The systems and methods disclosed herein are generally concerned with removal and concentration of perfluoroalkyl substances (PFAS). As disclosed herein, perfluoroalkyl substances also include polyfluoroalkyl substances. Perfluoroalkyl substances are carbon chain molecules having carbon-fluorine bonds. Polyfluoroalkyl substances are carbon chain molecules having carbon-fluorine bonds and also carbon-hydrogen bonds. Common PFAS molecules include perfluorooctanoic acid (PFOA), perfluorooctanesulfonic acid (PFOS), and short-chain organofluorine chemical compounds, such as the ammonium salt of hexafluoropropylene oxide dimer acid (HFPO-DA) fluoride (also known as GenX). PFAS molecules typically have a tail with a hydrophobic end and an ionized end.

PFAS are man-made chemicals used in a lot of industries. PFAS molecules typically do not break down naturally. As a result, PFAS molecules accumulate in the environment and within the human body. PFAS molecules contaminate food products, commercial household and workplace products, municipal water, agricultural soil and irrigation water, and even drinking water. PFAS molecules have been shown to cause adverse health effects in humans and animals.

Under conventional operation of an electrochemical separation device, an anion ion exchange resin used to remove PFOA from a waste stream was shown to retain PFOA by both ion exchange and adsorption. As previously described, under conventional methods of electrochemical separation, the PFOA ion moves significantly slowly through the ion exchange membrane due to the hydrophobicity adsorption. Furthermore, the fouled ion exchange membrane may not be regenerated by a conventional aqueous salt solution.

In accordance with the methods disclosed herein, a water miscible organic solvent solution may be used to efficiently transport hydrophobic ions through the membrane. Specifically, a water miscible organic solvent solution may desorb and exchange the hydrophobic ion from the membrane resin. When operating the ED device for removal of PFAS from a solution in the presence of a water miscible organic solvent according to certain exemplary embodiments disclosed herein, the organic solvent was shown to dissolve the PFAS molecule enabling transport of the PFAS through the IEM under the presence of the applied electrical field.

Thus, in accordance with one aspect, there is provided a method of treating a waste stream containing PFAS with an electrochemical separation device. The waste stream may contain at least 1 ppb of PFAS. For example, the waste stream may contain at least 1 ppb-ppm PFAS, at least 1 ppb-10 ppb PFAS, at least 1 ppb-1 ppm PFAS, or at least 1 ppm-10 ppm PFAS. The method may comprise directing the waste stream containing the PFAS to the dilution compartment of the electrochemical separation device. The method may comprise directing a treatment stream to the concentration compartment of the electrochemical separation device. At least one of the waste stream and the treatment stream may comprise a water miscible organic solvent. For instance, at least one of the waste stream and the treatment stream may comprise an effective amount of the water miscible organic solvent to enable transfer of ions through the membrane.

The method may comprise applying a voltage across the first and second electrodes to produce a dilute stream and a concentrate stream. The method may comprise controlling voltage across the first and second electrodes or current between the first and second electrodes to drive ions across the ion exchange membrane. In an electrochemical separation device, for a given electrical current, there may be corresponding rates of ionic transfer from the dilution compartment into the concentration compartment. The total amount of ions transferred per unit time may be referred to as the "salt removal rate," which is measured in units of mol/s or equiv/s. Generally, the applied voltage necessary to drive the current depends on the electrical resistance in the ion exchange membranes and in the dilution compartment, concentration compartment, and across the first and second electrodes. The voltage must also overcome the Donnan potential voltage across each membrane due to the difference in concentration on both sides of the membrane. When the difference in concentration is great, the voltage across the first and second electrodes may increase. The methods may comprise measuring and/or monitoring the voltage across the first and second electrodes or current between the first and second electrodes. At a predetermined value, the applied voltage and/or current may signal a need to regenerate or replace the ion exchange membrane.

Voltage drop across the membrane during operation may be a signal of membrane fouling. In accordance with certain embodiments, the water miscible organic solvent may prevent, inhibit, or reduce fouling of the membrane. Thus, the water miscible organic solvent may prevent, inhibit, or reduce voltage drop across the membrane. In certain embodiments, the water miscible organic solvent may be effective to enable treatment with a substantially constant voltage applied across the membrane during operation of the electrochemical separation device.

In certain embodiments, the membrane may be regenerated by reversing a polarity of the first and second electrodes. The methods may comprise periodically reversing polarity of the first and second electrodes and/or reversing polarity responsive to a measured parameter, such as applied voltage or current. Methods and systems disclosed herein may employ electrode reversal, reversing the voltage applied to the first and second electrodes, such that the positively charged anode becomes a negatively charged cathode and the negatively charged cathode becomes a positively charged anode. The polarity reversal may effectuate a change in the direction of ion transfer within the separation device, whereby the ion transfer reverses direction. Polarity reversal may be used to reduce fouling, prevent precipitation of sparingly soluble compounds within the concentration compartments, and/or prevent build-up of soluble compounds on the membranes. Devices capable of polarity reversal may be referred to as Electrodialysis Reversal (EDR) devices.

Alternately or additionally to the polarity reversal, the method may further comprise exchanging flow paths of the waste stream and the treatment stream, such that the waste stream containing PFAS is directed to the concentration compartment and the treatment stream is directed to the dilution compartment. The polarity reversal and flow reversal may effectively change the identity of the compartments, such that the previously-concentrating compartment is now a dilution compartment and the previously-diluting compartment is now a concentration compartment. The flow path exchange of the feed streams may be effectuated with valves configured to redirect the streams. In further cycles, the method may comprise reversing the polarity and/or exchanging fluid flow paths again, such that the electrodes and/or feed streams revert back to their original configuration.

The dilute stream may be substantially free of the PFAS. As disclosed herein, the dilute stream being "substantially free" of the PFAS may have at least 90% less PFAS by volume than the waste stream. The dilute stream being substantially free of the PFAS may have at least 92% less, at least 95% less, at least 98% less, at least 99% less, at least 99.9% less, or at least 99.99% less PFAS by volume than the waste stream. Thus, in some embodiments, the methods disclosed herein may be employed to remove at least 90% of PFAS by volume from the dilute fluid. The methods may remove at least 92%, at least 95%, at least 98%, at least 99%, at least 99.9%, or at least 99.99% of PFAS by volume from the dilute fluid.

The concentrate stream may comprise at least a majority of the PFAS. In certain embodiments, the methods disclosed herein may be employed to produce a concentrate fluid having at least 2×-100× concentrated PFAS by volume, for example, at least 2×, at least 5×, at least 10×, at least 50×, at least 2×-10×, at least 10×-50×, or at least 50×-100× PFAS by volume. For instance, the concentrate stream may comprise 10 ppm-20 ppm PFAS.

In some embodiments, the waste stream may be an aqueous solution containing the PFAS. The aqueous solution may be contaminated with at least 1 ppb of PFAS and up to 10 ppm of PFAS, as previously described. The aqueous solution may be a wastewater to be treated. For instance, the aqueous solution waste stream may be or comprise industrial water, irrigation water, food production water, pharmaceutical production water, municipal water, or drinking water contaminated with PFAS.

In some embodiments, the treatment stream may comprise the water miscible organic solvent. The treatment stream may be a water miscible organic solvent solution containing at least 45%-100% water miscible organic solvent by volume. The treatment stream may be about 45%, about 50%, about 55%, about 60%, about 65%, about 70%, about 75%, about 80%, about 85%, about 90%, about 95%, or about 100% water miscible organic solvent by volume. The treatment stream may comprise a volume of water miscible organic solvent effective to treat the waste stream.

In accordance with certain embodiments, the waste stream is an aqueous solution containing the PFAS and the treatment stream comprises a water miscible organic solvent. In certain exemplary embodiments, the waste stream may be an aqueous solution containing 1 ppb-10 ppb PFAS.

In some embodiments, the waste stream may comprise the water miscible organic solvent. For example, the waste stream may be a water miscible organic solvent solution containing at least 45%-85% water miscible organic solvent by volume. The waste stream may be about 45%, about 50%, about 55%, about 60%, about 65%, about 70%, about 75%, about 80%, or about 85% water miscible organic solvent by volume. The water miscible organic solvent solution may be contaminated with at least 1 ppb of PFAS and up to 10 ppm of PFAS, as previously described. The water miscible organic solvent solution may be or comprise a resin or membrane regeneration solution, an industrial solution, a food production solution, or a pharmaceutical production solution.

In some embodiments, the treatment stream is an aqueous solution. The aqueous solution may be pure water. The aqueous solution may contain ionizable species. The aqueous solution may be potable water, tap water, filtered water, or any aqueous stream. In some embodiments, the aqueous solution may have 50-600 ppm TDS, for example, 50-ppm TDS, 100-300 ppm TDS, 200-400 ppm TDS, or 300-600 ppm TDS. In some embodiments, the aqueous solution may have 1,000-10,000 ppm TDS, for example, 500-1,500 ppm TDS, 1,500-5,000 ppm TDS, or 5,000-10,000 ppm TDS.

In accordance with certain embodiments, the waste stream comprises a water miscible organic solvent containing the PFAS and the treatment stream is an aqueous solution. In such embodiments, the concentrate stream may comprise less than 2% water miscible organic solvent. For example, the concentrate stream may comprise 0.1%-2% water miscible organic solvent or 1%-2% water miscible organic solvent. In certain exemplary embodiments, the waste stream may a water miscible organic solvent solution, for example, alcohol solution, for example, a 45%-80% alcohol solution by volume, containing 1 ppm-ppm PFAS.

The water miscible organic solvent may comprise a compound listed in Table 1.

TABLE 1

Water Miscible Organic Solvents

| Solvent Compound | Chemical Formula |
|---|---|
| acetaldehyde | $CH_3CHO$ |
| acetic acid | $CH_3CO_2H$ |
| acetone | $(CH_3)_2CO$ |
| acetonitrile | $CH_3CN$ |
| 1,2-Butanediol | $C_4H_{10}O_2$ |
| 1,3-Butanediol | $C_4H_{10}O_2$ |
| 1,4-Butanediol | $HOCH_2CH_2CH_2CH_2OH$ |
| 2-Butoxyethanol | $C_6H_{14}O_2$ |
| butyric acid | $CH_3CH_2CH_2COOH$ |
| diethanolamine | $HN(CH_2CH_2OH)_2$ |
| diethylenetriamine | $HN(CH_2CH_2NH_2)_2$ |
| dimethylformamide | $(CH_3)_2NC(O)H$ |
| dimethoxyethane | $C_4H_{10}O_2$ |
| dimethyl sulfoxide | $(CH_3)_2SO$ |
| 1,4-Dioxane | $C_4H_8O_2$ |
| ethanol | $C_2H_6O$ |
| ethylamine | $CH_3CH_2NH_2$ |
| ethylene glycol | $C_2H_6O_2$ |
| formic acid | $HCOOH$ |
| furfuryl alcohol | $C_5H_6O_2$ |
| glycerol | $C_3H_8O_3$ |
| methanol | $CH_3OH$ |
| methyl diethanolamine | $CH_3N(C_2H_4OH)_2$ |
| methyl isocyanide | $CH_3NC$ |
| N-Methyl-2-pyrrolidone | $C_5H_9NO$ |
| 1-Propanol | $CH_3CH_2CH_2OH$ |
| 1,3-Propanediol | $CH_2(CH_2OH)_2$ |
| 1,5-Pentanediol | $HOCH_2CH_2CH_2CH_2CH_2OH$ |
| 2-Propanol | $(CH_3)_2CHOH$ |
| propanoic acid | $CH_3)CH_2)COOH$ |
| propylene glycol | $HOCH_2CHOHCH_3$ |
| pyridine | $C_5H_5N$ |
| tetrahydrofuran | $(CH_2)_4O$ |
| triethylene glycol | $C_6H_{14}O_4$ |

In certain embodiments, the water miscible organic solvent may be an alcohol solution. The alcohol solution may comprise at least one of methanol, ethanol, propanol, isopropanol, and butanol.

In certain embodiments, the water miscible organic solvent may be an ether solution. The ether solution may comprise at least one of dimethoxyethane, dioxane, and tetrahydrofuran.

In accordance with certain embodiments, operating the electrochemical separation device may comprise a once-through pass of feed water through the electrochemical separation device. For example, the electrochemical separation system may be operated with both the waste stream comprising PFAS and the treatment stream passing "once-through" their respective compartments to produce the outlet fluids.

Alternately, the systems and methods disclosed herein may employ recycling the concentrate stream to the concentration compartment. All or a portion of the concentrate stream produced by the concentration compartment may be recycled back to the concentration compartment to reduce the required treatment stream feed into the electrochemical device and increase concentration of the PFAS. The ionic concentration within the concentration compartment and the recirculation loop may increase as a function of the number of passes of the concentrate reject back into the concentration compartment.

The ion exchange membrane positioned in the electrochemical separation device should generally show physical stability during operation with a water miscible organic solvent. Conventional membrane materials usually swell significantly with an organic solvent, compromising the membrane and reducing intrinsic performance parameters, such as permselectivity. Thus, in accordance with certain embodiments, the ion exchange membrane may be designed and/or manufactured to withstand the water miscible organic solvent during operation. In particular, the ion exchange membranes disclosed herein may have a permselectivity of at least 90%, for example, at least 95%, at least 98%, or at least 99% during operation.

The ion exchange membranes used in the systems and methods disclosed herein may be manufactured from a cross linked ionic exchanger monomer. In particular, the ion exchange membrane may comprise a cationic functional monomer having a crosslinking group. For example, the functional monomer may have each ionic exchanger connected to a crosslinking node. The functional monomer may be bound to the polymer backbone. The membrane may comprise bound functional monomers throughout the entire polymer network. The membrane chemistry is shown in FIG. 1. Specifically, FIG. 1 shows the chemical structure of an exemplary quaternization reaction for the formation of a crosslinking ionic monomer.

The ion exchange membrane may be highly crosslinked. For example, in some embodiments, the ion exchange membrane may be 50%-100% crosslinked. In some embodiments, the ion exchange membrane may be 70%-100% crosslinked. The ion exchange membrane may be about 50%, about 60%, about 70%, about 80%, about 90%, or about 100% crosslinked.

During use, the highly crosslinked membrane tends to show a high resistance or low conductivity and a high chemical stability. To compensate, the ion exchange membrane may be formed as a thin polymeric material. In some embodiments, the ion exchange membrane may have a thickness of less than 100 μm. For example, the ion exchange membrane may have a thickness of 5-100 μm, for example, 10-100 μm, 5-50 μm, 10-50 μm, or 20-30 μm. The ion exchange membrane may have a thickness of about 10 μm, about 20 μm, about 25 μm, about 30 μm, or about 50 μm.

In some embodiments, the ion exchange membrane may have a resistivity of about 0.5-25 Ω-cm$^2$ when measured on direct current after equilibrium in a 0.5M NaCl solution at 25° C. For example, the ion exchange membrane may have a resistivity of about 1.0-10 Ω-cm$^2$, 3-10 Ω-cm$^2$, 3-4 Ω-cm$^2$, or 7-10 Ω-cm$^2$, depending on membrane thickness, when measured on direct current after equilibrium in a 0.5M NaCl solution at 25° C.

Exemplary experiments show that a 25 μm membrane has a resistivity of about 7-10 Ω-cm$^2$, a 10 μm thick membrane is projected to have a resistivity of about 3-4 Ω-cm$^2$, while a 75 μm thick membrane may have a resistivity closer to about 30 Ω-cm$^2$.

An ion exchange membrane as described in International Patent Application Publication No. WO2019/118662 titled "Anion Exchange Membranes for Redox Flow Batteries," incorporated herein by reference in its entirety for all purposes, may be used in the systems and methods disclosed herein.

When selecting a membrane, parameters typically include adequate chemical, thermal, electrochemical, and mechanical stability. Adequate mechanical stability and strength when swollen and under mechanical stress may also be considered. Other parameters may include low resistance, low or preferably no transport of the ionic species, and low cost. Development of an ion exchange membrane may include balancing some or all of these properties to overcome competing effects. Ion exchange membranes may be selected to meet certain characteristics, including (1) low electrical resistance to reduce potential drop during operation and increase energy efficiency; (2) high co-ion transport number, for example, high permeability to counter-ions but approximately impermeable to co-ions; (3) high chemical stability, including the ability to withstand any pH from 0 to 14 and oxidizing chemicals; (4) high mechanical strength to withstand the stresses of being handled while being manufactured into a module or other processing device; and (5) good dimensional stability in operation, for instance, adequate resistance to swelling or shrinking when contacting fluid changes concentration or temperature.

Thin anion exchange membranes having low resistance, low diffusivity, high co-ion transport number, and good chemical stability can be produced by polymerizing cationic functional monomers having a cross-linking group. As described herein, a composite ion exchange membrane was developed comprising a microporous membrane substrate saturated with a cross-linked polymer having charged ionic groups. Anion exchange membranes disclosed herein may have a thickness of less than 100 μm, a resistance of between about 5.0 Ω-cm$^2$ and about 8.0 Ω-cm$^2$ when in use, and provide steady state diffusivity of less than 0.4 ppm/hr/cm$^2$ with respect to at least one of the cation species. The properties of the ion exchange membrane described herein may generally allow the membrane to operate at a low resistance (high conductance) while not sacrificing integrity of the membrane. While the disclosure generally contemplates anion exchange membranes, it should be understood that similar methods may be performed to produce cation exchange membranes. Namely, where the ionic polymer comprises a relevant functional group.

International Application Publication No. WO/2011/025867, herein incorporated by reference in its entirety, describes a method of producing ion exchange membranes including combining one or more monofunctional ionogenic monomers with at least one multifunctional cross-linking monomer, and polymerizing the monomers in the pores of a porous substrate.

In accordance with one aspect, there is provided a method of producing the ion exchange membrane described herein. The disclosure generally describes the chemistry and materials used for production of an exemplary ion exchange membrane. To produce a cross-linked membrane, the micropores of a substrate may be saturated with a polymerization product comprising a cross-linking functional monomer, followed by polymerizing the monomer in the micropores.

The monomer may comprise a functional group and a cross-linking group. Herein, the term cross-linking group may refer to a monomer substituent or moiety having a polymerization reaction site, which can form networked or cross-linked polymers. The term ionic functional group may refer to a monomer substituent or moiety having a charged group covalently attached. The charged group can be positively charged or negatively charged. The monomers described herein may generally comprise at least one functional group and at least one cross-linking group. In accordance with certain embodiments, the molecules described herein may comprise a hydrocarbon base structure.

The functional cross-linked monomer may provide stability to the membrane. Membrane stability and relative tightness generally depends on the degree of cross-linking with the same monomer. The stability may also depend on the miscibility between the functional group and the cross-linking group. When the two groups are not miscible, typically due to the hydrophobic and hydrophilic natures of the cross-linking group and ionic group respectively, a solvent may be added to produce a polymerization solution. During a thermal polymerization process, the volatile solvent may evaporate, changing the distribution of monomers in solution. The solvent may also change the reactivity of the two groups due to a solvation effect. The result is generally the formation of a block co-polymer instead of an even distribution of monomers.

If the functional monomer is not itself cross-linked, the functional group may risk detachment from the polymer network. When each functional group is cross-linked, the hydrolysis of the ester group only reduces the cross-linking degree, which may reduce the degradation rate of the membrane. Thus, as provided by the functional cross-linking monomers disclosed herein, the monomer may become fully cross-linked, and the functional group may be covalently linked to the polymer backbone of the membrane. The degradation of the membrane may be reduced, resulting in increased chemical stability in electrolyte solution and significantly increasing longevity. Additionally, due to the cross-linking group, the polymerization product may be substantially free of a cross-linking agent.

In certain nonlimiting embodiments, the method may comprise integrating a cationic functional monomer having a cross-linking group in a polymerization product and coating a microporous substrate having a thickness of less than about 100 μm with the polymerization product. The polymerization product may be substantially free of a cross-linking agent. The polymerization product may include a solvent. The polymerization product may include a polymerization initiator.

The functional group may include a positively charged amine group, for example, a quaternary ammonium group. A tertiary amine group may be quaternized with a quaternizing chemical. The quaternary ammonium functional group may be strongly basic and ionized to act over the pH range of 0 to 14, allowing a broad operational range.

The cross-linking group may produce a membrane with a high cross-link density without the addition of an external cross-linking agent. Cross-linking monomers may have at least one polymerization reaction site. In some embodiments, cross-linking monomers may have more than one polymerization reaction site. In some embodiments, the polymer is 100% cross-linked.

The cationic functional monomer may be copolymerized with at least one secondary functional monomer. The secondary functional monomer may be configured or selected to alter ion exchange capability without cross-linking. The secondary functional monomer may be selected from the group including, but not limited to, vinylbenzyltrimethylammonium chloride, trimethylammonium ethylmethacyrlic chloride, methacrylamidopropyltrimethylammonium chloride, (3-acrylamidopropyl) trimethylammonium chloride, 2-vinylpyridine, and 4-vinylpyridine, and one or more polymerization initiators.

The cationic functional monomer may be copolymerized with at least one non-functional secondary monomer. The non-functional secondary monomer may be configured or selected to alter resistivity of the membrane. The non-functional secondary monomer may be configured or selected to alter miscibility of the monomers and/or polymerization product. For instance, the non-functional monomer may be selected for its ability to prevent phase separation caused by the hydrophobic and hydrophilic natures of the cross-linking group and ionic group respectively. Furthermore, copolymerization with the non-functional monomer may allow the polymerization product to remain thoroughly mixed without excess solvent. In some embodiments, the non-functional secondary monomer may be selected from the group including, but not limited to, styrene, vinyl toluene, 4-methylstyrene, t-butyl styrene, alpha-methylstyrene, methacrylic anhydride, methacrylic acid, n-vinyl-2-pyrolidone, vinyltrimethoxysilane, vinyltriethoxysilane, vinyl-tris-(2-methoxyethoxy)silane, vinylidene chloride, vinylidene fluoride, vinylmethyldimethoxysilane, 2,2,2,-trifluoroethyl methacrylate allyamine, vinylpyridine, maleic anhydride, glycidyl methacrylate, hydroxyethylmethacrylate, methylmethacrylate, or ethylmethacrylate.

In some embodiments, and for certain envisioned uses, a cross-linking agent may be incorporated. Such cross-linking agent may be chosen from, for example, propylene glycol dimethacrylate, isobutylene glycol dimethacrylate, Octavinyl POSS®, Octavinyldimethylsilyi POSS®, Vinyl POSS® mixture, OctaVinyl POSS®, Trisilabolethyl POSS®, Trisilanolisobutyl POSS®, Trisilanolisooctyl POSS®, Octasilane POSS®, Octahydro POSS®, epoxycyclohexyl-POSS® cage mixture, glycidyl-POSS® cage mixture, methacryl POSS® cage mixture, or Acrylo POSS® cage mixture, all distributed by Hybrid Plastics (Hattiesburg, Mississippi).

The method may comprise coating the microporous substrate with the polymerization product. The polymerization product may comprise one or more solvents. Solvents which may be incorporated include 1-propanol and dipropylene glycol. Hydroxy containing solvents, such as alcohols (for example, isopropanol, butanol, diols, such as various glycols, or polyols, such as glycerine) may be incorporated in some embodiments. Additionally, aprotic solvents, such as N-methylpyrrolidone and dimethylacetamide, may be incorporated. These solvents are exemplary, and additional or alternative solvents may be apparent to one of ordinary skill in the art.

The polymerization product may include free radical initiators, for example, benzoyl peroxide (BPO), ammonium persulfate, 2,2'-azobisisobutyronitrile (AIBN), 2,2'-azobis (2-methylpropionamidine)dihydrochloride, 2,2'-azobis[2-(2-imidazolin-2yl)propane]dihydrochloride, 2,2'-azobis[2-(2-imidazolin-2-yl)propane], and dimethyl 2,2'-azobis(2-methylpropionate).

The microporous substrate may be selected to have adequate mechanical stability, porosity, and thickness. In accordance with certain embodiments, the microporous substrate may have a thickness of less than 100 μm, a porosity of between about 25% and about 45% and an average pore size of between about 50 nm and about 10 μm. The microporous substrate may comprise at least one of polypropylene, high molecular weight polyethylene, ultrahigh molecular weight polyethylene, polyvinyl chloride, polyvinylidene fluoride, polysulfone, and combinations thereof. These exemplary materials may generally have high mechanical stability at a thickness of 15 μm or greater.

In general, the thickness of the microporous substrate may be as small as feasible while providing adequate mechanical stability to the anion exchange membrane. The thickness of the microporous membrane may be measured without accounting for pore depth. In some embodiments, the microporous substrate may have a thickness of less than about 155 μm. The microporous substrate may have a thickness of less than about 100 μm. The microporous substrate may have a thickness of less than about 75 μm. The microporous substrate may have a thickness of less than about 55 μm. In accordance with certain embodiments, the microporous substrate may have a thickness of about 25 μm. The microporous substrate may have a thickness of about 15 μm, 20 μm, 25 μm, 30 μm, 35 μm, 40 μm, or 45 μm.

The porosity may be selected to enable adequate coating on the substrate while maintaining an adequate mechanical stability. Thus, the porosity may be selected based on coating composition, substrate material, and/or substrate thickness. The porosity, expressed as a percentage, may refer to the volume of the pores with respect to the total volume of the substrate. In some embodiments, the microporous membrane may have a porosity of between about 25% and about 45%. The microporous membrane may have a porosity of between 20% and 40%. The microporous membrane may have a porosity of about 20%, about 25%, about 30%, about 35%, about 40%, or about 45%. In other embodiments, the porosity may be greater than about 45%. For instance, the porosity may be greater than about 60% or greater than about 70%. In non-limiting exemplary embodiments, the substrate material may be ultrahigh molecular weight polyethylene, the thickness of the substrate may be between about 15 μm and about 35 μm, and the porosity may be selected to be about 35%.

The porosity may also be selected to correspond with a selected average pore size, and vice versa. The average pore size may also be selected based on coating composition and/or substrate material. For instance, the average pore size may be selected to enable a substantially even coating on the substrate. The average pore size may additionally or alternatively be selected to have an effect on membrane performance. Membrane pore size may alter resistance, diffusivity, ion transport number, and tightness of the membrane structure. While not wishing to be bound by any particular theory, it is believed that the selected membrane parameters (pore size, degree of cross-linking, ionic functionality, and thickness, among others) together enable the membrane performance.

In some embodiments, the average pore size may range between about 50 nm and about 10 μm. The average size may from about 100 nm to about 1.0 μm. The average pore size may be from about 100 nm to about 200 nm. The average pore size may be about 100 nm, about 125 nm, about 150 nm, about 175 nm, about 200 nm, about 225 nm, or about 25° nm.

The microporous substrate material may be selected to have adequate mechanical stability at the desired thickness and porosity. In some embodiments, the microporous substrate may comprise at least one of polypropylene, high molecular weight polyethylene, ultrahigh molecular weight polyethylene, polyvinyl chloride, polyvinylidene fluoride, polysulfone, and combinations thereof. These exemplary materials may generally have high mechanical stability at a thickness of 15 μm or greater. Additionally, the exemplary materials may have high mechanical stability at such thicknesses and having a porosity of up to 70%.

The method may further comprise heating the coated microporous substrate or performing the coating step at an elevated temperature. For example, the substrate pore filling or saturation may be performed at a temperature greater than or about 40° C. to reduce air solubility. In some embodiments, the substrate may be coated under a vacuum treatment by submersion in the polymerization solution followed by a heating step.

The method may comprise removing air bubbles after coating the microporous substrate. In some embodiments, a substrate sample may be presoaked and treated to remove air bubbles, for example, by placing on a polyester or similar sheet, covering with a covering sheet, and smoothing out to remove the air bubbles. This process may be performed on a single sheet or in the aggregate.

The polymerization may be performed in a heating unit or on a heated surface. The coated substrate may be placed on a heated surface at a temperature sufficient and for a time sufficient to initiate and complete polymerization. The sufficient time and temperature may generally be dependent on the polymerization product composition. Alternate methods for the polymerization reaction may be employed, for example, treatment with ultraviolet light or ionizing radiation (such as gamma radiation or electron beam radiation).

An ion exchange membrane as described in U.S. Pat. No. 9,023,902 titled "Ion Exchange Membranes," incorporated herein by reference in its entirety for all purposes, may be used in the systems and methods disclosed herein.

In exemplary embodiments, the ion exchange membranes may be produced by a process comprising choosing a suitable porous substrate, saturating the porous regions of the substrate with a solution comprising a monofunctional ionogenic monomer, a multifunctional monomer, and a polymerization initiator, removing excess solution from the surfaces of the substrate while leaving the porous volume saturated with solution, initiating polymerization by the application of heat, ultraviolet light, or ionizing radiation, optionally in the absence of substantially all oxygen, to form a crosslinked ion transferring polymer substantially completely filling the pores of the substrate.

The microporous support may comprise microporous membranes of polypropylene, high molecular weight polyethylene, ultrahigh molecular weight polyethylene or polyvinylidene fluoride. The supports may have a thickness of less than about 55 μm, for example, less than 25 μm or less than 10 μm.

Monomers containing negatively charged groups useful for making cation exchange membranes include as representative examples, without being limited by such examples; sulfonated acrylic monomers suitable to provide cation exchange capacity; e.g., 2-sulfoethylmethacrylate (2-SEM), 2-Propylacrylic acid, 2-acrylamide-2-methyl propane sulfonic acid (AMPS), sulfonated glycidylmethacrylate, 3-sulfopropyl methacrylate, sodium 1-allyloxy-2 hydroxypropyl sulfonate and the like; other example monomers are acrylic and methacrylic acid or their salts, sodium styrene sulfonate, styrene sulfonic acid, sulfonated vinylbenzyl chloride sodium 1-allyloxy-2 hydroxypropyl sulfonate, 4-Vinylbenzoic acid, Trichloroacrylic acid, vinyl phosphoric acid and vinyl sulfonic acid. Preferred monomers are 2-sulfoethylmethacrylate (2-SEM), styrene sulfonic acid and its salts, and 2-acrylamide-2-methyl propane sulfonic acid (AMPS)

Monomers containing positively charged groups useful for making anion exchange membranes include as representative examples, without being limited by such examples; Methacrylamidopropyltrimethyl ammonium chloride, trimethylammoniumethylmethacrylate; quaternary salts of polyamines and vinylaromatic halides, for example, but limited to; 1,4-diazabicyclo[2,2,2]octane di(vinylbenzyl chloride) (a quaternary salt of 1,4-diazabicyclo[2,2,2]octane (DABCO) and piperazine divinyl chloride; or quaternary salts formed by reacting cyclic ethers, polyamines and alkyl halides: for example, but not limited to; Iodoethyldimethylethylenediamino2-hydroxylpropyl methacrylate (a quaternary ammonium salt formed by reacting glycidylmethacrylate (GMA) with N,N-dimethylethylenediamine and ethyl iodide, and vinylbenyltrimethylammonium chloride.

Exemplary monomers for anion exchange membranes are Trimethylammoniumethylmethacrylic chloride, 3-acrylamidopropyl)trimethylammonium chloride, 1,4-diazabicyclo[2,2,2]octane di(vinylbenzyl chloride) (a quaternary salt of 1,4-diazabicyclo[2,2,2]octane (DABCO) and vinylbenzyl chloride, N,N,N',N',N"-pentamethyldiethylenetriamine di(vinylbenzyl chloride (a quaternary salt of N,N,N',N',N"-pentamethyldiethylenetriamine and vinylbenzyl chloride, Glycidyl methacrylate/trimethylamine or Glycidyl methacrylate/N,N-dimethylethylenediamine reaction product.

Multifunctional monomers suitable to provide crosslinking with monomers containing negatively or positively charged groups include as representative examples, without being limited by such examples ethyleneglycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidylmethacrylate, trimethylolpropane trimethacrylate, ethoxylated (n) bisphenol A di(meth)acrylate (n=1.5, 2, 4, 6, 10, 30), ethoxylated (n) trimethylolpropanetri(meth)Acrylate (n=3, 6, 9, 10, 15, 20), propoxylated(n) trimethylolpropane triacrylate (n=3, 6), vinylbenzyl chloride, glycidyl methacrylate and the like.

Multifunctional monomers containing one or more ionic groups may be used. Without being limited by the example, monomers such as 1,4-divinylbenzene-3 sulfonic acid or its salts may be used.

In certain embodiments, the ion exchange membrane may be produced by the polymerization of one or more ionogenic monomers, a neutral monomer, and a suitable crosslinker. Exemplary neutral monomers include hydroxyethyl acrylate and hydroxymethylmetacrylate.

In accordance with another aspect, there is provided a method of concentrating PFAS from a wastewater containing a concentration of PFAS. The wastewater containing the PFAS may be an aqueous solution containing PFAS, as previously described. Aqueous solutions containing trace amounts of PFAS, for example, as low as 1-10 ppb PFAS, may be treated to meet regulatory discharge requirements in accordance with the methods disclosed herein.

The method may comprise passing the wastewater containing the PFAS over an ion exchange resin to uptake the PFAS onto the ion exchange resin. The ion exchange resin may be anion exchange resin. In particular, the negatively charged PFAS ions may be attracted to the positively charged anion exchange resin. The method may comprise removing at least 90% of the PFAS, for example, at least 95%, at least 98%, at least 99%, at least 99.9%, or at least 99.99% of the PFAS by passing the wastewater over the ion exchange resin. System design parameters, such as choice of ion exchange resin, ion exchange resin bed depth, and length of contact area of the ion exchange resin may be selected to increase PFAS removal from the wastewater. Method parameters such as flow rate may also be controlled to increase PFAS removal from the wastewater. The method may be effective to produce a treated water meeting regulatory discharge requirements and being substantially free of PFAS.

The method may comprise regenerating the ion exchange resin by passing a regeneration stream comprising a water miscible organic solvent solution over the ion exchange resin. In exemplary embodiments, the regeneration stream may contain 45%-85% water miscible organic solvent in an aqueous solution. The regeneration stream may further comprise inorganic salts. In some embodiments, the waste stream may comprise 1,000-30,000 ppm inorganic salts. Exemplary inorganic salts include ammonium, sodium, potassium, and calcium salts. Other exemplary inorganic salts include group 1 (lithium, sodium, potassium, cesium, rubidium) salts. The inorganic salts may be, for example, group 1 or ammonium salts of nitrate, chloride, or hydroxide. Other inorganic salts are within the scope of the disclosure. In exemplary embodiments, the regeneration stream may contain about 6,000-8,000 ppm $NaNO_3$. In other exemplary embodiments, the regeneration stream may contain about 5,000-15,000 ppm NaCl. The regeneration stream may take up PFAS from the ion exchange resin, producing a waste stream comprising the PFAS.

During regeneration, the regeneration stream may collect a concentrated amount of the PFAS from the ion exchange resin. Thus, the waste stream may have a greater concentration of PFAS than the concentration of PFAS in the aqueous solution wastewater. In some embodiments, the waste stream may comprise 1-10 ppm PFAS. The waste stream may comprise the water miscible organic solvent, concentrated PFAS, and any inorganic salts used for the regeneration of the ion exchange resin.

In some embodiments, the systems and methods disclosed herein are useful for recovery of the contaminated water miscible organic solvent from the waste stream. The water miscible organic solvent may be recovered from the waste stream by treatment with an electrochemical separation device, as previously described. Thus, the methods may comprise directing the waste stream comprising the water miscible organic solvent and the PFAS to a dilute compartment of the electrochemical separation device to remove PFAS from the waste stream. The treatment with the electrochemical separation device may additionally desalt any inorganic salts from the waste stream.

Treatment with the electrochemical separation device may produce a dilute stream comprising the water miscible organic solvent solution being substantially free of the PFAS. The dilute stream may additionally be substantially free of any inorganic salts. In some embodiments, the method may comprise directing the dilute stream to regenerate the ion exchange resin. Thus, the water miscible organic solvent used for regeneration of the ion exchange resin may be recovered, reducing the need for fresh water miscible organic solvent in the PFAS treatment process. In certain embodiments, the method may comprise dosing the dilute stream with inorganic salts for regeneration of the ion exchange resin.

Figure 2:
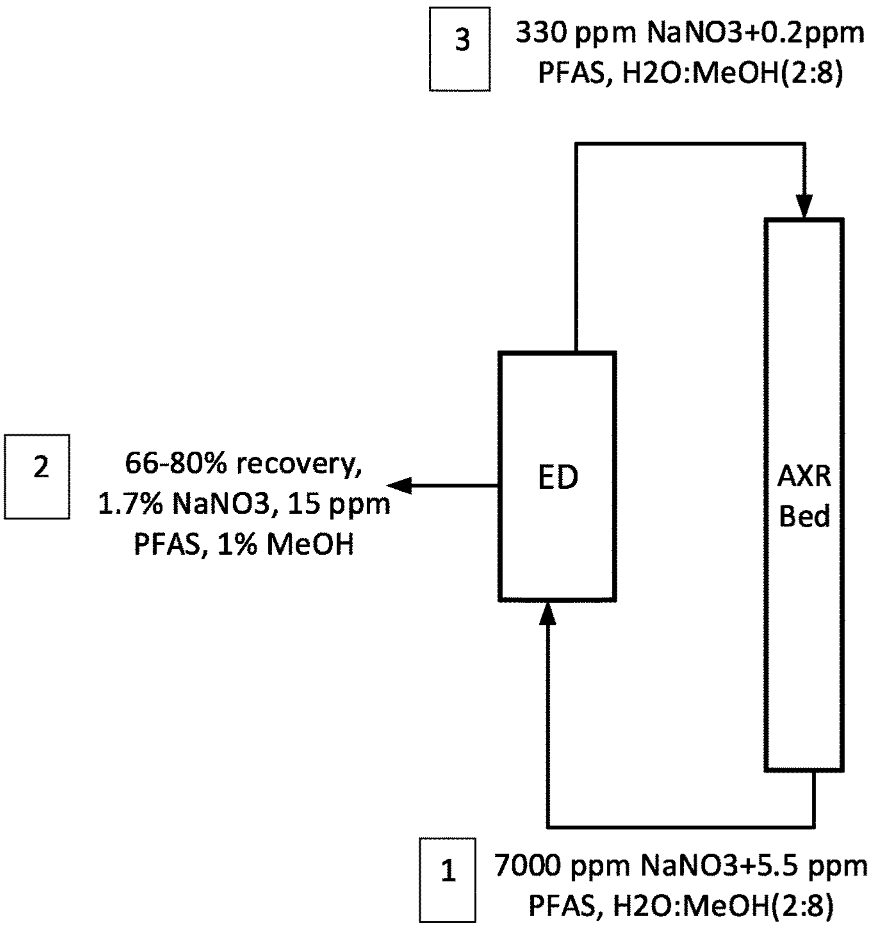
FIG. 2 is a box diagram showing an exemplary method for the concentration of PFAS from a waste stream.

An exemplary PFAS concentration and ion exchange resin regeneration method is shown in the box diagram of FIG. 2. Briefly, an 80% methanol solution having 7,000 ppm $NaNO_3$ is used to regenerate an ion exchange resin and uptake 5.5 ppm PFAS from the resin. The regeneration solution is directed to an electrodialysis unit at reference numeral 1. The electrodialysis unit produces a concentrate stream having 1.7% $NaNO_3$, 15 ppm PFAS, and 1% methanol, indicated at reference numeral 2. The electrodialysis unit produces a dilute stream having 330 ppm NaNO3, 80% methanol, and 0.2 ppm PFAS at reference numeral 3. The dilute stream may be directed to regenerate the ion exchange resin.

The methods disclosed herein may comprise measuring one or more parameter of a fluid stream. For instance, the methods may comprise measuring one or more parameter selected from flow rate, temperature, pH, and conductivity. The methods may comprise measuring the one or more parameter in a waste stream comprising PFAS. The methods may comprise measuring the one or more parameter in the dilute stream and/or the concentrate stream. The methods may comprise measuring the one or more parameter in the treatment stream. In certain embodiments, the methods may comprise recirculating the concentrate stream back to the electrochemical separation device. The concentrate stream may be recirculated responsive to a measured parameter. For instance, in one exemplary embodiment, the concentrate stream may be recirculated responsive to a conductivity measurement of the concentrate stream. In some embodiments, the dilute stream may be directed to regenerate an ion exchange resin responsive to a measured parameter. For instance, in one exemplary embodiment, the dilute stream may be directed to regenerate an ion exchange resin responsive to a conductivity measurement of the dilute stream.

Figure 3:
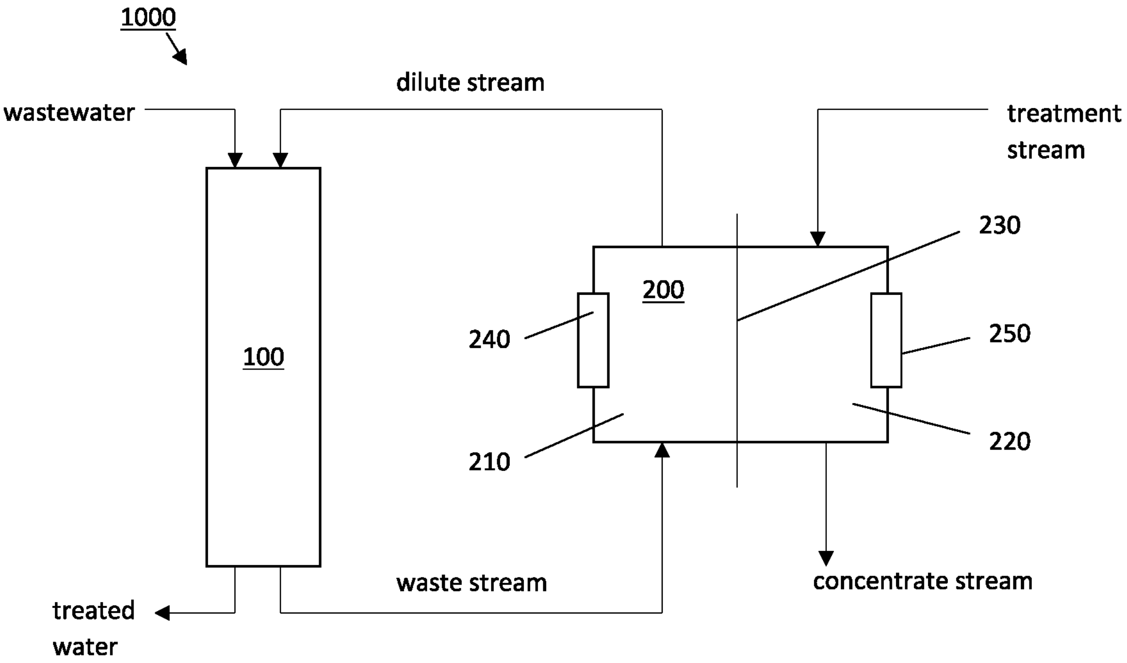
FIG. 3 is a box diagram of an exemplary system for concentrating PFAS, according to one embodiment.

In accordance with another aspect, there is provided a system for concentration of PFAS. An exemplary system for concentration of PFAS is shown in FIG. 3. The system 1000 of FIG. 3 comprises a column 100 comprising an ion exchange resin. The column 100 is shown having a first inlet fluidly connectable to a source of a wastewater containing the PFAS and a second inlet fluidly connectable to a source of a regeneration solution comprising a water miscible organic solvent. The column 100 is shown having a treated wastewater outlet, and a waste stream outlet.

The system 1000 comprises an electrochemical separation device 200 comprising a dilution compartment 210 having an inlet fluidly connected to the waste stream outlet of the column 100 and a dilute stream outlet fluidly connected to the second inlet of the column 100. The electrochemical separation device 200 comprises a concentration compartment 220 having an inlet fluidly connectable to a source of an aqueous solution and a concentrate stream outlet. The electrochemical separation device 200 comprises an ion exchange membrane 230 positioned between the dilution compartment 210 and the concentration compartment 220. The electrochemical separation device 200 comprises a first electrode 240 and a second electrode 250 positioned at distal ends of the electrochemical separation device.

Figure 4A:
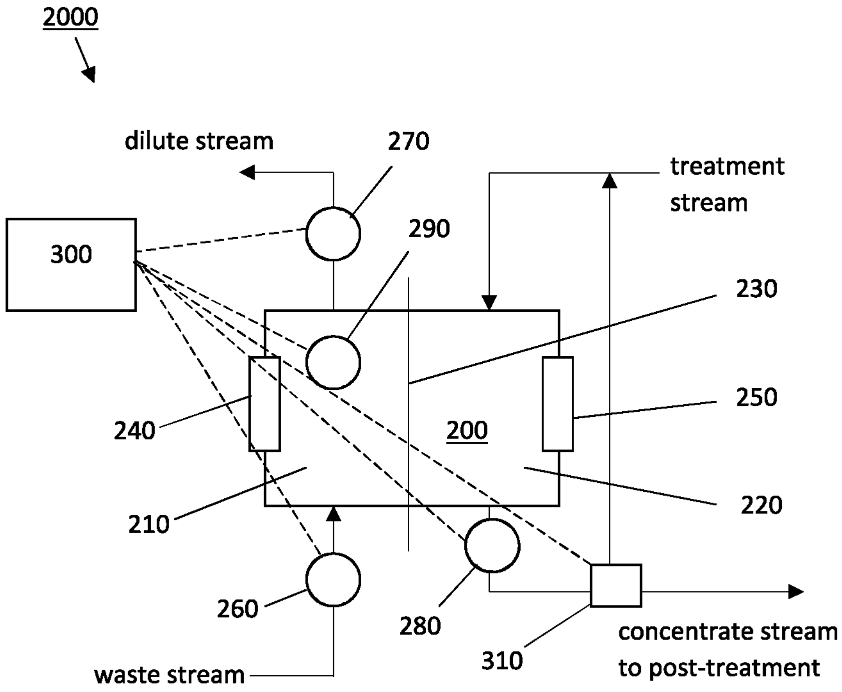
FIG. 4A is a box diagram of an exemplary system for concentrating PFAS, according to one embodiment.

Another exemplary system for concentration of PFAS is shown in FIG. 4A. The system 2000 of FIG. 4A comprises an electrochemical separation device 200 as shown in system 1000 of FIG. 3. The system 2000 of FIG. 4A comprises a plurality of sensors 260, 270, 280, 290 positioned to measure one or more parameter of the waste stream (sensor 260), the dilute stream (sensor 270), and the concentrate stream (sensor 280). The fluid stream sensors may measure one or more of flow rate, temperature, pH, and conductivity of the streams. The system 2000 of FIG. 4A includes a sensor 290 positioned to measure one or more of applied voltage and current between first and second electrodes 240, 250. The system includes controller 300 operatively connected to electrodes 240, 250. The controller may be operatively connected to sensors 260, 270, 280, 290.

Exemplary system 2000 also includes a concentrate recirculation loop. The concentrate stream may be redirected to the concentration compartment 220 of the electrochemical separation device. Valve 310 may direct the concentrate stream to a post-treatment subsystem or back to the concentration compartment 220. In certain embodiments, valve 310 may be operatively connected to controller 300. The methods may comprise recirculating the concentrate stream responsive to a measured parameter of the concentrate stream. For instance, controller 300 may be configured to actuate valve 310 to direct the concentrate stream back to the concentration compartment 220 responsive to a parameter measured by a sensor, such as sensor 280. Alternatively, controller 300 may be configured to actuate valve 310 to direct the concentrate stream to a post-treatment subsystem responsive to a parameter measured by a sensor, such as sensor 280.

In certain exemplary embodiments, the concentrate may be treated for further use. For instance, the concentrate stream may be further treated to meet discharge requirements. The concentrate stream comprising the water miscible organic solvent may be treated to recover the water miscible organic solvent. In certain exemplary embodiments, the water miscible organic solvent comprising an alcohol solution may be directed to an alcohol solution refinery. The alcohol solution may be post-treated to produce an alcohol fuel. Any produced alcohol fuel may be used to produce electrical energy. In certain embodiments, the alcohol fuel may be used to produce electrical energy with the system power source. Thus, the concentrate stream may be used to generate power for the system.

Figure 4B:
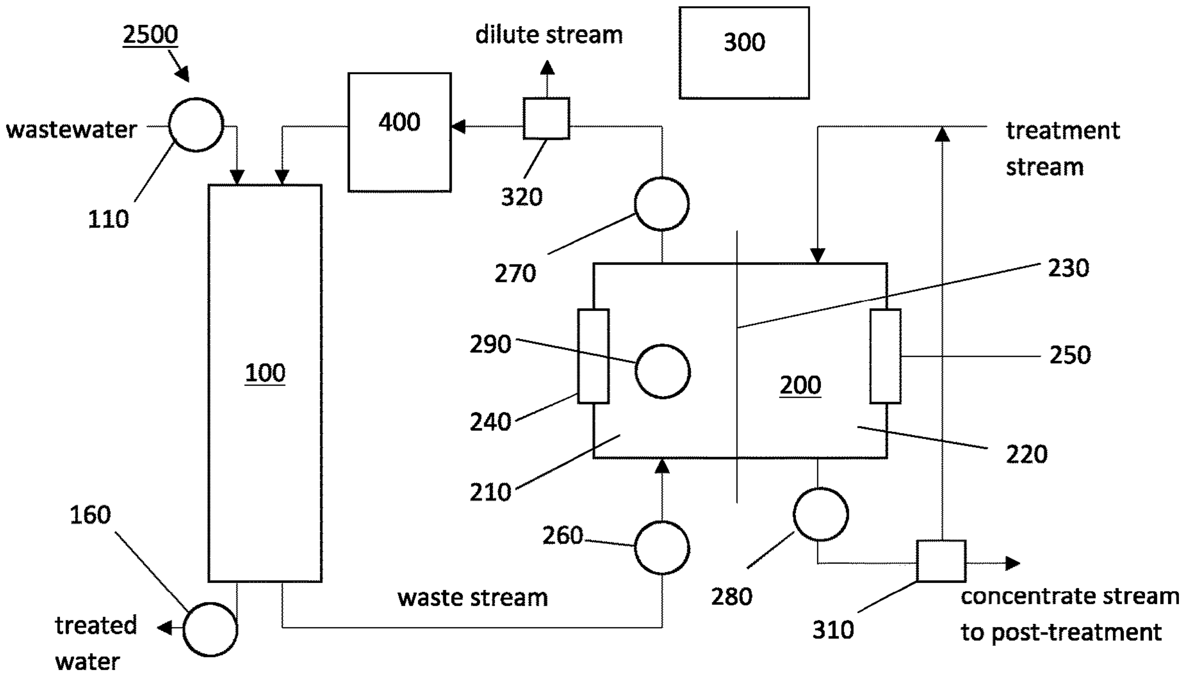
FIG. 4B is a box diagram of an exemplary system for concentrating PFAS, according to one embodiment.

Another exemplary system for concentration of PFAS is shown in FIG. 4B. The system 2500 of FIG. 4B comprises a column 100 and electrochemical separation device 200 similar to system 1000. The system 2500 of FIG. 4B comprises controller 300 and a concentration recirculation loop similar to system 2000. The system 2500 of FIG. 4B comprises sensors 260, 270, 280, 290 similar to system 2000. System 2500 additionally comprises sensor 160 configured to measure a parameter of the treated water. Sensor 160 may be operatively connected to controller 300.

The system 2500 of FIG. 4B comprises valve 310 similar to system 2000. System additionally comprises valve 320 configured to direct the dilute stream to the column or out of the system. Valve 320 may be operatively connected to controller 300. In some embodiments, controller 300 may be configured to actuate valve 320 responsive to a parameter measured by a sensor, such as sensor 270. System 2500 comprises holding tank positioned downstream from valve 320. Holding tank 400 may be configured to store recirculated dilute stream for use in regeneration of column 100. In some embodiments, regeneration of column 100 may be initiated responsive to a parameter measured by a sensor, such as sensor 160. System 2500 includes pump 110 positioned to direct wastewater to column 100. Pump 110 may be operatively connected to sensor 300. Sensor 300 may be configured to control flow rate of wastewater through column 100 responsive to a parameter measured by a sensor, such as sensor 160.

In accordance with certain embodiments, the system may comprise any one or more features as described above, for example, as shown in FIGS. 3 and 4A-4B. The features may be incorporated and/or combined as desired.

Thus, in some embodiments, the system may comprise a controller. The controller may be operatively connected to first and second electrodes. The controller may be operatively connected with one or more sensor, pump, or valve of the system, as previously described.

The controller may be a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source. The controller may be digitally connected to the one or more components. The controller may be connected to the one or more components through a wireless connection. For example, the controller may be connected through wireless local area networking (WLAN) or short-wavelength ultra-high frequency (UHF) radio waves. The controller may further be operably connected to any additional pump or valve within the system, for example, to enable the controller to direct fluids as needed. The controller may be coupled to a memory storing device or cloud-based memory storage.

Multiple controllers may be programmed to work together to operate the system. For example, a controller may be programmed to work with an external computing device. In some embodiments, the controller and computing device may be integrated. In other embodiments, one or more of the processes disclosed herein may be manually or semi-automatically executed.

In accordance with another aspect, there is provided a method of facilitating treatment of a waste stream containing PFAS. The method may comprise providing an electrochemical separation device, as previously described. The method may comprise providing instructions to direct the waste stream containing the PFAS to the dilution compartment. The method may comprise providing instructions to direct a treatment stream to the concentration compartment. The method may comprise providing instructions to apply a voltage across the first and second electrodes to produce a dilute stream being substantially free of the PFAS and a concentrate stream.

The method may comprise providing the waste stream. For example, the method may comprise providing the water miscible organic solvent solution containing the PFAS. The method may comprise providing the aqueous solution containing the PFAS.

The method may comprise providing instructions to direct the dilute stream to an ion exchange resin having the PFAS thereon. The dilute stream may be directed to regenerate an ion exchange resin, as previously described.

In some embodiments, the method may comprise providing the ion exchange resin. The method may comprise fluidly connecting a regeneration fluid of the ion exchange resin to the waste stream or the dilution compartment of the electrochemical separation device. The method may comprise fluidly connecting a dilute stream outlet of the electrochemical separation device to the ion exchange resin.

The method may comprise providing the treatment solution. For example, the method may comprise providing the water miscible organic solvent solution treatment solution and directing the treatment solution to the concentration compartment. The method may comprise providing the aqueous solution treatment solution and directing the treatment solution to the concentration compartment.

The method may comprise providing one or more sensor. The method may comprise providing instructions to install the one or more sensor as previously described, for example, as shown in FIGS. 4A-4B. The method may comprise providing a controller. The method may comprise providing instructions to operatively connect the controller to one or more sensor, valve, pump, and/or electrode. The method may comprise programming the controller or providing instructions to program the controller to actuate one or more valve and/or apply a voltage or current responsive to a measurement obtained by one or more sensor.

In some embodiments, the method may comprise providing instructions to direct the concentrate stream to a post-treatment subsystem. The concentrate stream may be treated to meet regulatory discharge requirements. The concentrate stream may be treated to produce a fuel for power generation. Thus, in certain embodiments, the method may comprise providing instructions to direct the concentrate stream to a refinery and/or power supply.

EXAMPLES

The function and advantages of these and other embodiments can be better understood from the following examples. These examples are intended to be illustrative in nature and are not considered to be limiting the scope of the invention.

Example 1: Treatment of Aqueous and 50% Methanol Solutions Containing PFAS

Waste streams containing PFAS were directed to a dilute compartment of an electrodialysis device. A first waste stream sample contained PFAS in a 1% NaCl aqueous solution. A second waste stream sample contained PFAS in a 50% methanol, 1% NaCl solution. An aqueous solution was directed to the concentrate compartment of the electrodialysis device. The electrodes were operated at a current density of 14 $A/m^2$. Voltage drop across the ion exchange membrane was measured and recorded. The results are shown in the graph of FIG. 5.

Figure 5:
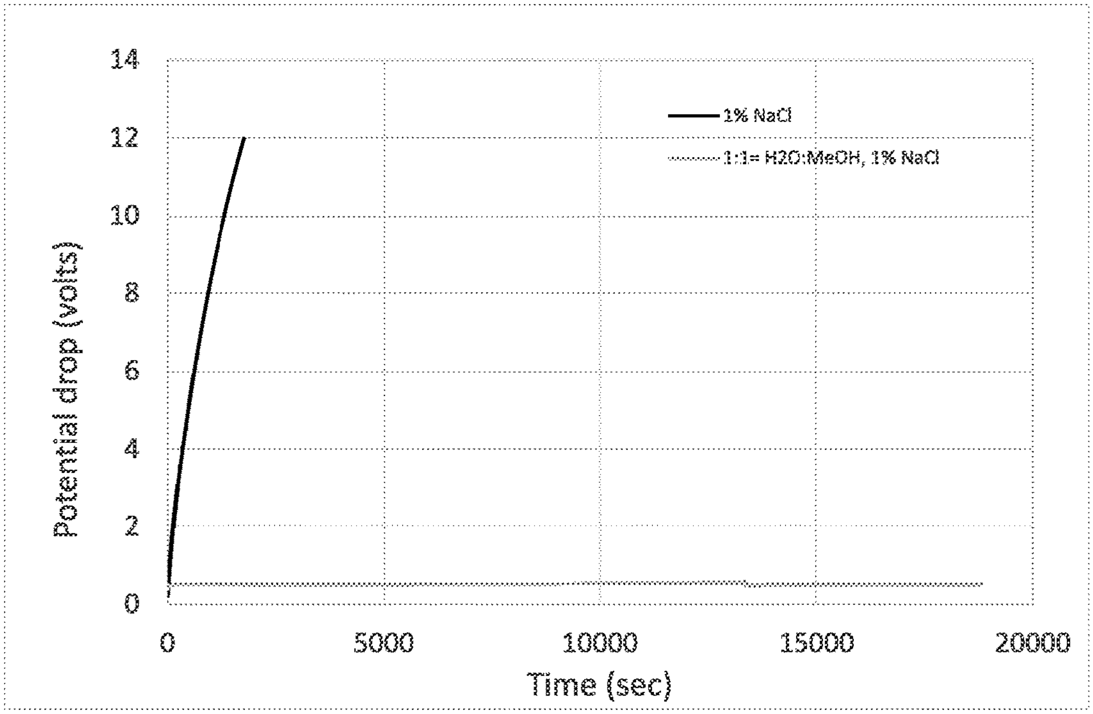
FIG. 5 is a graph showing voltage drop across an ion exchange membrane during electrochemical treatment of an aqueous solution and a 50% methanol solution, according to one embodiment.

As shown in the graph of FIG. 5, during treatment of the aqueous solution waste stream, the ion exchange membrane showed a rapid potential change or conductivity reduction. The potential change shows PFOS fouling from temporary stationary anions in the membrane structure. During treatment of the 50% methanol solution waste stream, voltage across the membrane was substantially constant. No organic fouling was detected. Both membranes operated at a faraday efficiency of equal to or greater than 95%.

Accordingly, voltage was substantially constant and membrane fouling was inhibited during electrochemical separation of PFAS from a waste stream by directing a water miscible organic solvent to the dilution compartment. Similar results are expected for treatment of an aqueous PFAS waste stream by directing a water miscible organic solvent solution to the concentration compartment.

Example 2: Treatment of 80% Methanol Solution Containing PFAS

Figure 6:
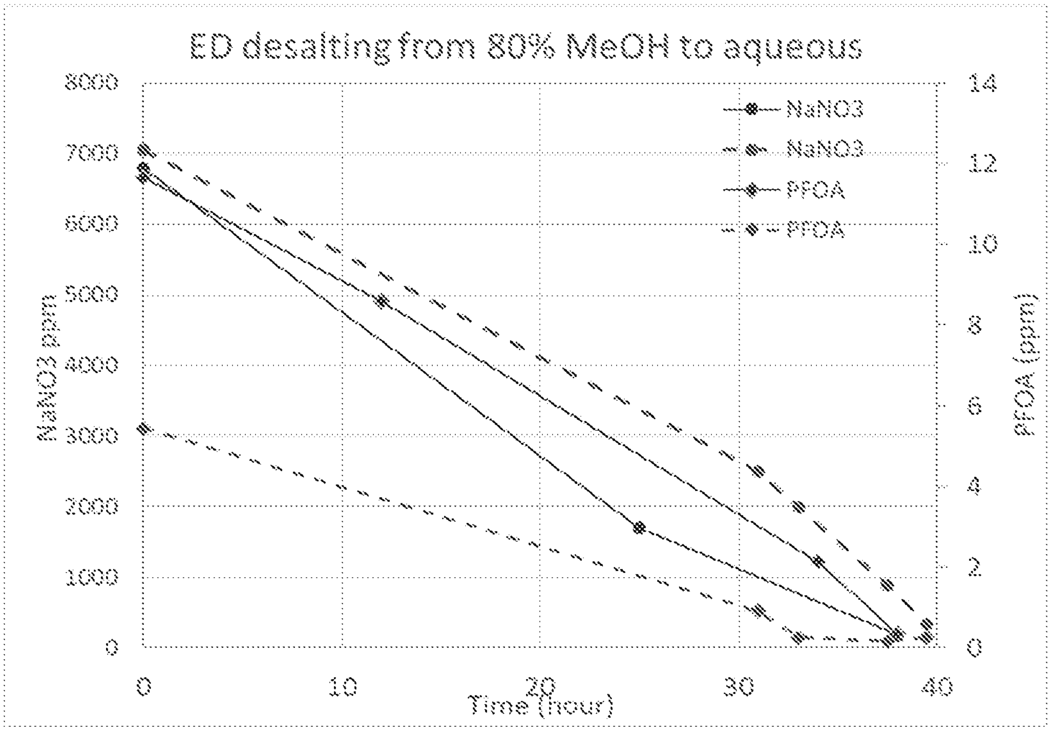
FIG. 6 is a graph showing removal of inorganic salts and PFOA during electrochemical treatment of an 80% methanol solution containing PFOA, according to one embodiment.

An 80% methanol solution waste stream with 5-10 ppm PFOA and 0.08 M $NaNO_3$ was directed to the dilute compartment of an electrodialysis device. An aqueous solution of 0.08 M $NaNO_3$ in pure water was directed to the concentrate compartment of the electrodialysis device. The change in PFOA and salt concentration in the dilute stream is shown in the graph of FIG. 6. About 1%-2% methanol was detected in the concentrate stream due to diffusion across the membrane from the dilute compartment. The ion exchange membrane did not show any trend of degradation during the operation. Current efficiency was 90%-94% throughout the experiment.

As shown by the data presented in the graph of FIG. 6, salt and PFOA were removed from the dilute stream by electrodialysis. Accordingly, the methods disclosed herein are effective at removal of PFOA from a water miscible organic solvent solution containing an inorganic salt, such as an ion exchange resin regeneration fluid.

Example 3: Treatment of Aqueous Solution Containing PFAS

Figure 7:
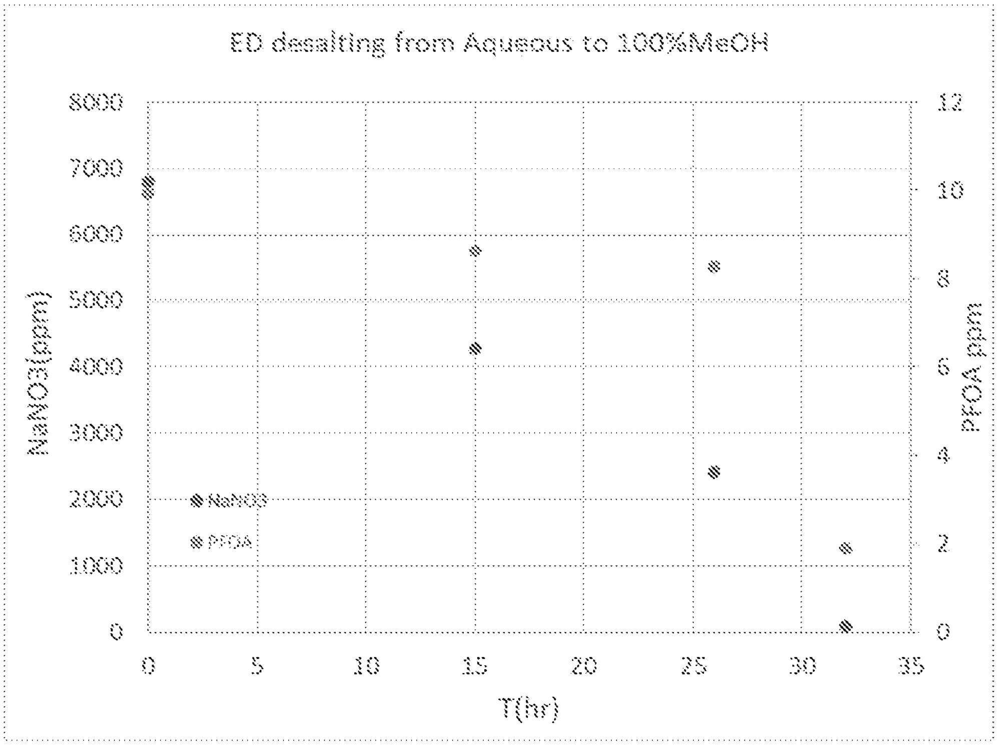
FIG. 7 is a graph showing removal of PFOA and inorganic salts during electrochemical transfer of ions from an aqueous solution to a methanol solution, according to one embodiment.

A pure water aqueous solution containing 7000 ppm $NaNO_3$ and 10 ppm PFOA was directed to the dilute compartment of an electrodialysis device. A 100% methanol solution was directed to the concentrate compartment. The change in PFOA and salt concentration in the dilute stream is shown in the graph of FIG. 7. The concentrate stream contained PFAS in 100% methanol. The concentrate stream may be used as fuel, for example, may be burned in a thermal combustion apparatus of an internal combustion engine.

As shown by the data presented in the graph of FIG. 7, salt and PFOA were removed from the aqueous solution dilute stream. A sharp drop in PFOA concentration is seen after the salt concentration is substantially reduced. In particular, after about 25 hours of operation 65% of salt is removed. About 60% of PFOA is removed in the 5 hours following the large salt removal (hours 25-30 of operation). It is believed salt and PFOA compete for removal in the system. However, both are adequately removed after sufficient electrodialysis time.

The membrane did not show signs of fouling. Accordingly, PFOA may be removed from an aqueous solution in an electrochemical separation device by directing a water miscible organic solvent to the concentrate stream.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of treating a waste stream containing perfluoroalkyl substances (PFAS) with an electrodialysis device comprising a dilution compartment, a concentration compartment, an anion exchange membrane including a microporous substrate comprising polyethylene having a porosity of between 25% and 45% with an average pore size of between 50 nm and 10 um positioned between the dilution compartment and the concentration compartment, and first and second electrodes, the method comprising:

- flowing the waste stream containing the PFAS through the dilution compartment;
- flowing a treatment stream through the concentration compartment, the treatment stream consisting of a water miscible organic solvent; and
- applying a voltage across the first and second electrodes to cause migration of the PFAS across the anion exchange membrane from the dilution compartment to the concentration compartment, and form a dilute stream being substantially free of the PFAS and a concentrate stream.

2. The method of claim 1, wherein the waste stream is an aqueous solution.

3. The method of claim 1, wherein the waste stream comprises the water miscible organic solvent.

4. The method of claim 3, wherein the water miscible organic solvent is an alcohol solution.

5. The method of claim 4, wherein the alcohol solution comprises at least one of methanol, ethanol, propanol, isopropanol, and butanol.

6. The method of claim 5, wherein the alcohol solution comprises methanol.

7. The method of claim 6, wherein the alcohol solution is 45%-85% methanol by volume.

8. The method of claim 1, wherein the anion exchange membrane has a thickness of 10-50 μm.

9. The method of claim 8, wherein the anion exchange membrane has a resistivity of about 3-10 $\Omega$-$cm^2$ when measured on direct current after equilibrium in a 0.5M NaCl solution at 25° C.

10. The method of claim 1, wherein applying the voltage across the first and second electrodes produces the dilute stream having at least 95% less PFAS by volume than the waste stream.

11. The method of claim 1, further comprising measuring at least one parameter selected from the group consisting of flow rate, temperature, pH, and conductivity of the waste stream, dilute stream, and concentrate stream, applied voltage between the first and second electrodes, and current between the first and second electrodes.

12. The method of claim 11, further comprising changing operation of the electrodes based on the at least one parameter.

13. The method of claim 12, further comprising controlling a valve at an outlet of the concentration compartment to direct the concentrate stream back to the concentrate compartment or to a post-treatment subsystem based on a measured parameter of the concentrate stream.

14. A method of concentrating perfluoroalkyl substances (PFAS) from a wastewater containing a concentration of PFAS, comprising:

- passing the wastewater containing the PFAS over an ion exchange resin to uptake the PFAS onto the ion exchange resin;
- regenerating the ion exchange resin by passing a regeneration stream comprising an alcohol solution over the ion exchange resin to remove the PFAS and produce a waste stream comprising the alcohol solution containing the PFAS;
- flowing the waste stream through a dilution compartment of an electrodialysis device;
- flowing a treatment stream through a concentration compartment of the electrodialysis device, the treatment stream consisting of a water miscible organic solvent; and
- applying a voltage across first and second electrodes of the electrodialysis device through an anion exchange membrane including a microporous substrate comprising polyethylene having a porosity of between 25% and 45% with an average pore size of between 50 nm and 10 um positioned between the dilution compartment and the concentration compartment to cause migration of the PFAS across the anion exchange membrane from the dilution compartment to the concentration compartment, and form a dilute stream comprising the alcohol solution being substantially free of the PFAS and a concentrate stream.

15. The method of claim 14, further comprising directing the dilute stream to regenerate the ion exchange resin.

16. The method of claim 14, wherein the regeneration stream further comprises inorganic salts.

* * * * *